United States Patent
Yamamoto et al.

(10) Patent No.: US 7,948,486 B2
(45) Date of Patent: May 24, 2011

(54) APPARATUS AND METHOD FOR PERFORMING HIDDEN SURFACE REMOVAL AND COMPUTER PROGRAM PRODUCT

(75) Inventors: Sumihiko Yamamoto, Tokyo (JP); Takashi Takemoto, Kanagawa (JP); Yasuharu Takenaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1098 days.

(21) Appl. No.: 11/225,051

(22) Filed: Sep. 14, 2005

(65) Prior Publication Data

US 2006/0187220 A1 Aug. 24, 2006

(30) Foreign Application Priority Data

Feb. 24, 2005 (JP) ................................. 2005-048826

(51) Int. Cl.
*G06T 15/40* (2011.01)

(52) U.S. Cl. .......................... 345/421; 345/419; 345/422

(58) Field of Classification Search ........................ None
See application file for complete search history.

(56) References Cited

U.S. PATENT DOCUMENTS

| | | | | |
|---|---|---|---|---|
| 5,596,686 A | * | 1/1997 | Duluk, Jr. | 345/422 |
| 6,052,125 A | * | 4/2000 | Gardiner et al. | 345/421 |
| 6,184,888 B1 | * | 2/2001 | Yuasa et al. | 345/419 |
| 6,480,205 B1 | * | 11/2002 | Greene et al. | 345/631 |
| 6,593,923 B1 | * | 7/2003 | Donovan et al. | 345/422 |
| 6,646,639 B1 | | 11/2003 | Greene et al. | |
| 7,030,877 B1 | * | 4/2006 | Sell | 345/422 |
| 2003/0025695 A1 | * | 2/2003 | Morphet | 345/423 |

FOREIGN PATENT DOCUMENTS

| | | |
|---|---|---|
| JP | 08-161526 | 6/1996 |
| JP | 09-179999 | 7/1997 |
| JP | 2000-331185 | 11/2000 |

* cited by examiner

*Primary Examiner* — Said Broome
(74) *Attorney, Agent, or Firm* — Oblon, Spivak, McClelland, Maier & Neustadt, L.L.P.

(57) ABSTRACT

An image processing apparatus includes a first and second Z value calculators that calculate a polygon Z value and a block Z value, respectively. The polygon Z value is a coordinate value of a pixel located at a closest point to a viewpoint. The block Z value is a coordinate value of a pixel located at a closest point to the viewpoint in a block. The apparatus also includes a Z value selector that selects a Z value of a pixel closer to the viewpoint from the polygon Z value and the block Z value as an estimate Z value; and a hidden-surface removal unit that eliminates drawing of the polygon in the block when a pixel corresponding to the estimate Z value is located at a farther point from the viewpoint than a pixel located at a farthest point from the viewpoint.

12 Claims, 6 Drawing Sheets

○ ...PIXEL CORRESPONDING TO BLOCK Z VALUE

APPARATUS AND METHOD FOR PERFORMING HIDDEN SURFACE REMOVAL AND COMPUTER PROGRAM PRODUCT

CROSS-REFERENCE TO RELATED APPLICATIONS

This application is based upon and claims the benefit of priority from the priority Japanese Patent Application No. 2005-048826, filed on Feb. 24, 2005; the entire contents of which are incorporated herein by reference.

BACKGROUND OF THE INVENTION

1. Field of the Invention

The present invention relates to an image processing apparatus and an image processing method, which execute drawing processing of three-dimensional (3D) computer graphics, and a computer program product for image processing.

2. Description of the Related Art

In the drawing processing of the 3D computer graphics, if plural drawn objects overlap when viewed from a viewpoint, Z values, which are coordinate values in a depth direction of respective pixels, are compared, and a drawn object located closest to the viewer is drawn whereas a drawn object located at a deeper point than the former object is eliminated. This processing is called "hidden-surface removal".

For the hidden-surface removal, a Z-buffer which stores Z values of pixels of one frame must be provided, and Z values of newly drawn object must be compared with the stored Z value in the Z-buffer. The data of the Z-buffer is usually placed in a memory such as a Dynamic Random Access Memory (DRAM) with a low access rate, making the memory access for the writing/reading of the data of the Z-buffer a bottleneck in the processing of 3D computer graphics drawing. An access frequency to the Z-buffer therefore significantly affects the overall performance of the 3D computer graphics processing apparatus.

One conventionally proposed method to improve the performance through reduced access frequency to the Z-buffer divides a drawing area into rectangular areas called blocks, and employs a hierarchical Z-buffer which stores a Z value of a deepest pixel among pixels in the block, thereby achieving the hidden-surface removal on block-to-block basis prior to the hidden-surface removal on pixel-to-pixel basis.

According to the proposed method, when a drawn object is a polygon occupying some pixels in a block, a Z value of a pixel which is closest to the viewer is found as a $Z_{near}$ value. Then, the $Z_{near}$ value is compared with a Z value of a deepest pixel of a previously drawn polygon(s) in the pertinent block stored in the hierarchical Z-buffer. If the pixel of the $Z_{near}$ value is located deeper than the pixel of the corresponding Z value stored in the hierarchical Z-buffer, drawing of the pixels of the newly-drawn polygon in the pertinent block is eliminated altogether. Then, the frequency of memory access can be reduced compared with the pixel-based hidden surface removal, to enhance the processing performance.

If the calculation of the $Z_{near}$ value takes time, however, performance may be deteriorated, nullifying the introduction of block-based hidden surface removal. Hence, the high-speed calculation of the $Z_{near}$ value is imperative. However, for the precise calculation of the $Z_{near}$ value, the intersection between the block area and the polygon area needs to be identified. Such processing requires a significantly high computational cost, and might hinder the high-speed calculation of the $Z_{near}$ value.

Hence, a Z value of a pixel closer to the viewer than the pixel of the precise $Z_{near}$ value may be utilized for the hidden-surface removal. Such a Z value can be more easily and speedily found than the precise $Z_{near}$ value.

When the Z value of the pixel located closer to the viewer than the pixel of the precise $Z_{near}$ value is employed for the hidden-surface removal, since the actual pixels of the polygon are surely located deeper than the pixel corresponding to this Z value, a pixel which is supposed to be in front of the previously-drawn polygon is not eliminated. Further, the precision of hidden-surface removal can be maintained at a high level if the Z value is highly approximate to the precise $Z_{near}$ value.

For example, U.S. Pat. No. 6,646,639 (hereinafter also referred to as Patent Literature 1) discloses a method to use a Z value of a closest pixel on a plane of the newly drawn polygon in the block area (block Z value) instead of the $Z_{near}$ value. According to Patent Literature 1, the closest pixel is selected from pixels at four corners of the block based on the information on the inclination of the plane formed by the newly-drawn polygon. Thus, since the identification of the intersection between the polygon area and the block area is not necessary, the high-speed hidden-surface removal is allowed.

According to the technique of the Patent Literature 1, however, when the pixel selected from the four corners of the block is located outside the area occupied by the polygon, the difference between the block Z value and the $Z_{near}$ value becomes notable, and the efficient hidden-surface removal may be hindered.

If the polygon of the data is large and the pixels selected from the four corners of the block are highly likely to be located in the polygon area, negative effect to the performance efficiency will be ignorable. In recent years, however, the resolution of the image dealt with in the 3D computer graphics is increasing, whereby in the drawing the polygon is likely to be smaller and the pixels selected from the four corners of the block are highly likely to be located outside the polygon area. Then, the efficient hidden-surface removal is difficult to be guaranteed.

SUMMARY OF THE INVENTION

According to one aspect of the present invention, an image processing apparatus includes a hierarchical Z value storing unit that stores a hierarchical Z value which is a coordinate value, in a depth direction, of a pixel located at a farthest point from a viewpoint among pixels already drawn in a block, the block being a section formed as a part of a drawing area in which an image of three-dimensional computer graphics is drawn; a first Z value calculator that calculates a polygon Z value which is a coordinate value, in the depth direction, of a pixel located at a closest point to the viewpoint among pixels corresponding to vertexes of a polygon which is a unit of drawing; a second Z value calculator that calculates a block Z value which is a coordinate value, in the depth direction, of a pixel located at a closest point to the viewpoint in the block among pixels included in a plane formed by the polygon; a Z value selector that selects a Z value of a pixel which is closer to the viewpoint from the polygon Z value and the block Z value as an estimate Z value which is an estimate of a coordinate value, in the depth direction, of a pixel located at a closest point to the viewpoint in the polygon in the block; and a hidden-surface removal unit that eliminates drawing of the polygon in the block when a pixel corresponding to the estimate Z value is located at a farther point from the viewpoint than a pixel corresponding to the hierarchical Z value.

According to another aspect of the present invention, an image processing method includes calculating a polygon Z value which is a coordinate value in a depth direction of a pixel located at a closest point to a viewpoint among pixels corresponding to vertexes of a polygon which is a unit of drawing; calculating a block Z value which is a coordinate value, in the depth direction, of a pixel located at a closest point to the viewpoint in a block, which is a section formed as a part of a drawing area in which an image of three-dimensional computer graphics is drawn, among pixels included in a plane formed by the polygon; selecting a Z value of a pixel which is closer to the viewpoint from the polygon Z value and the block Z value, an estimate Z value which is an estimate of a coordinate value in the depth direction of a pixel located at a closest point to the viewpoint in the polygon in the block; and eliminating drawing of the polygon in the block when a pixel corresponding to the estimate Z value is located at a farther point from the viewpoint than a pixel corresponding to a hierarchical Z value, the hierarchical Z value being a coordinate value, in the depth direction, of a pixel located at a farthest point from the viewpoint among pixels already drawn in the block and being stored in a storing unit.

A computer program product according to still another aspect of the present invention causes a computer to perform the image processing method according to the present invention.

DETAILED DESCRIPTION OF THE PREFERRED EMBODIMENTS

Figure 1:
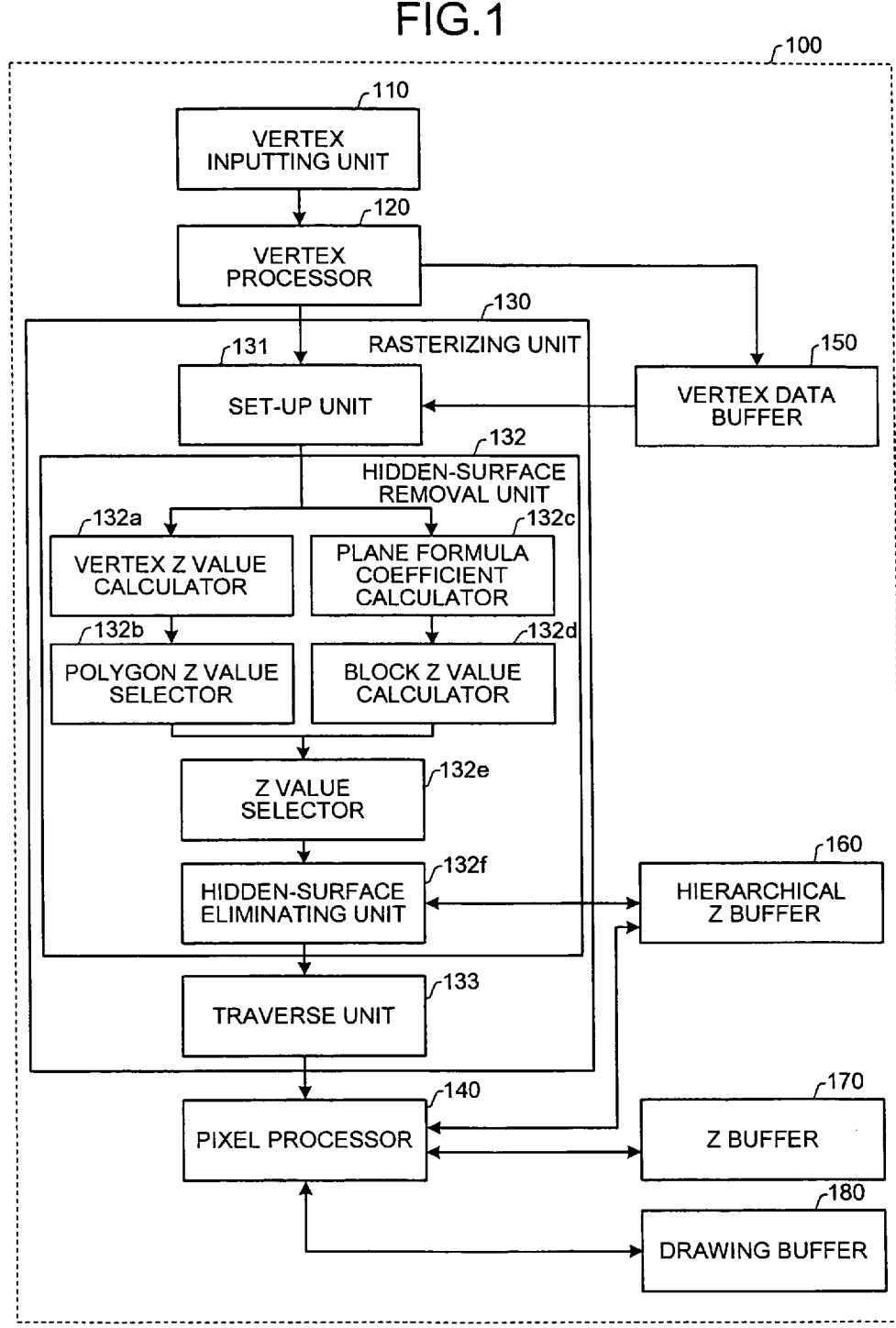
FIG. 1 is a block diagram of a structure of an image processing apparatus according to an embodiment of the present invention.

Exemplary embodiments an image processing apparatus, an image processing method, a computer program product for image processing, relating to the present invention, will be described in detail with reference to the accompanying drawings.

The image processing apparatus according to the embodiment of the present invention performs hidden-surface removal by selecting a block Z value from four corners of a block, selecting a polygon Z value from three vertexes of a drawn polygon, selecting one of the block Z value and the polygon Z value which corresponds with a pixel that is present in a deeper location as an estimated Z value, which is an estimate of a $Z_{near}$ value, and comparing the estimated Z value with a hierarchical Z value stored in a hierarchical Z buffer.

Here, the "block" is a unit for hidden-surface removal and consists of a section of an area where an image is drawn as the 3D computer graphics, i.e., a drawing area. In the embodiment, the block is a rectangular section of the drawing area. The depth of the block extends from the section in a direction along a visual line, and forms a block as a three-dimensional figure. Thus, the block, which is a section of the drawing area, can be two-dimensional when the drawing area is two-dimensional, whereas the block is treated as being three-dimensional when three-dimensional information such as depth information is to be considered.

The hierarchical Z value is a Z value of a pixel which is located at a deepest point in a block among pixels already drawn when seen from a predetermined viewpoint. The hierarchical Z value is stored for each block in the hierarchical Z buffer which is provided for storage of the hierarchical Z values. Here, Z value is a coordinate value of a pixel along a depth axis with respect to the viewpoint. The hidden-surface removal for each block is allowed through the utilization of the hierarchical Z value.

The polygon is a unit of drawing having the shape of a polygon, which is also a section of a surface of a drawn object and utilized for the representation of the shape of the three-dimensional figure of the drawn object in an image generated by the 3D computer graphics drawing. In general, a triangle is used as the polygon. In the drawing process, the polygon is the unit of drawing and the hidden-surface removal is performed for each block in each polygon.

The polygon Z value is a Z value of a pixel located at a closest point to the viewpoint among the pixels corresponding to the vertexes of the drawn polygon. The polygon Z value is determined based on one of the vertexes of the polygon regardless of a block under the hidden-surface removal.

The block Z value is a Z value of a pixel located at a closest point to the viewpoint among the pixels included in the surface formed by the polygon in the block under the hidden-surface removal.

The $Z_{near}$ value is a Z value of a pixel located closest to the viewpoint among the pixels of the drawn polygon(s) in the block under the hidden-surface removal. For the precise calculation of the $Z_{near}$ value, the determination of the intersection between the polygon and the block is required, which demands an excessively high computational cost. Hence, in general an estimated value is obtained via a manner which requires a lower computational cost, and employed instead of the $Z_{near}$ value.

The estimated Z value is an estimate of the $Z_{near}$ value and employed as a substitution for the $Z_{near}$ value. In other words, the estimated Z value is not a precise $Z_{near}$ value but an approximation of the precise $Z_{near}$ value obtained via various techniques.

FIG. 1 is a block diagram of a structure of an image processing apparatus 100 according to the embodiment of the present invention. As shown in FIG. 1, the image processing apparatus 100 includes a vertex inputting unit 110, a vertex processor 120, a rasterizing unit 130, a pixel processor 140, a vertex data buffer 150 secured in a random access memory (RAM), a hierarchical Z buffer 160, a Z buffer 170, and a drawing buffer 180.

The vertex inputting unit 110 serves to receive an input of vertex data of a triangle to be drawn. Here, the vertex data is consisted of a coordinate of the vertex, and vertex parameters such as color, fog, texture coordinates, and normal vector.

The vertex processor 120 serves to perform processing on the vertex data supplied by the vertex inputting unit 110.

The rasterizing unit 130 serves to generate pixel data of the polygon from the vertex data after the processing by the vertex processor 120. The rasterizing unit 130 includes a set-up unit 131, a hidden-surface removal unit 132, and a traverse unit 133.

The pixel processor 140 serves to perform processing such as the hidden-surface removal and the drawing for each pixel on the pixel data generated by the rasterizing unit 130.

The set-up unit 131 serves to acquire the vertex data of the polygon from the vertex data buffer 150 which stores the vertex data and to generate necessary set-up data for rasterizing.

The hidden-surface removal unit 132 serves to perform hidden-surface removal for each block utilizing the hierarchical Z value stored in the hierarchical Z buffer 160 prior to the hidden-surface removal for each pixel by the pixel processor 140, thereby eliminating the drawing of the polygon which is a hidden-surface in each block.

The traverse unit 133 serves to generate pixel data for the block which is not eliminated by the hidden-surface removal unit 132 using the set-up data generated by the set-up unit 131. The image processor 100 may be configured so that the hidden-surface removal unit 132 and the traverse unit 133 perform the processing in parallel using the set-up data provided by the set-up unit 131, then the pixel data generated by the traverse unit 133 is eliminated for each block according to the result of the processing by the hidden-surface removal unit 132, and the result is output to the pixel processor 140.

As shown in FIG. 1, the hidden-surface removal unit 132 includes a vertex Z value calculator 132*a*, a polygon Z value selector 132*b*, a plane formula coefficient calculator 132*c*, a block Z value calculator 132*d*, a Z value selector 132*e*, and a hidden-surface eliminating unit 132*f*.

The vertex Z value calculator 132*a* serves to calculate a Z value of each vertex of the drawn polygon. The polygon Z value selector 132*b* selects a minimum Z value from the Z values of vertexes calculated by the vertex Z value calculator 132*a*, as the polygon Z value. In a coordinate system employed in the embodiment, unless otherwise described, a pixel with a smaller Z value represents a pixel closer to the viewpoint. The coordinate system may be configured so that a pixel with a larger Z value represents a pixel closer to the viewpoint.

The plane formula coefficient calculator 132*c* serves to calculate a coefficient of a plane formula which represents a plane formed by an input polygon using the coordinate of each vertex of the drawn polygon. The block Z value calculator 132*d* serves to calculate the block Z value by a combination of a negative coefficient and a positive coefficient of the plane formula calculated by the plane formula coefficient calculator 132*c*.

The Z value selector 132*e* serves to compare the polygon Z value selected by the polygon Z value selector 132*b* and the block Z value calculated by the block Z value calculator 132*d* for each block in which the drawn polygon is present, to select a larger Z value, i.e., a Z value corresponding to a deeper polygon from the viewpoint as the estimated Z value, which is the estimate of the $Z_{near}$ value.

The hidden-surface eliminating unit 132*f* serves to compare the estimated Z value selected by the Z value selector 132*e* and the hierarchical Z value stored in the hierarchical Z buffer 160 to eliminate the drawing of the polygon for each block when the estimated Z value is larger than the hierarchical Z value, i.e., when the pixel corresponding to the estimated Z value is located at a deeper point than the pixel corresponding to the hierarchical Z value.

The vertex data buffer 150 serves to store the vertex data supplied as an input from the vertex processor 120. The hierarchical Z buffer 160 serves to store the hierarchical Z value which is the Z value of a pixel located at a deepest point from the viewpoint among the already drawn pixels for each block. The Z buffer 170 serves to store the Z value of pixel data processed by the pixel processor 140 for each pixel. The drawing buffer 180 serves to store color information of the pixel data processed by the pixel processor 140.

Figure 2:
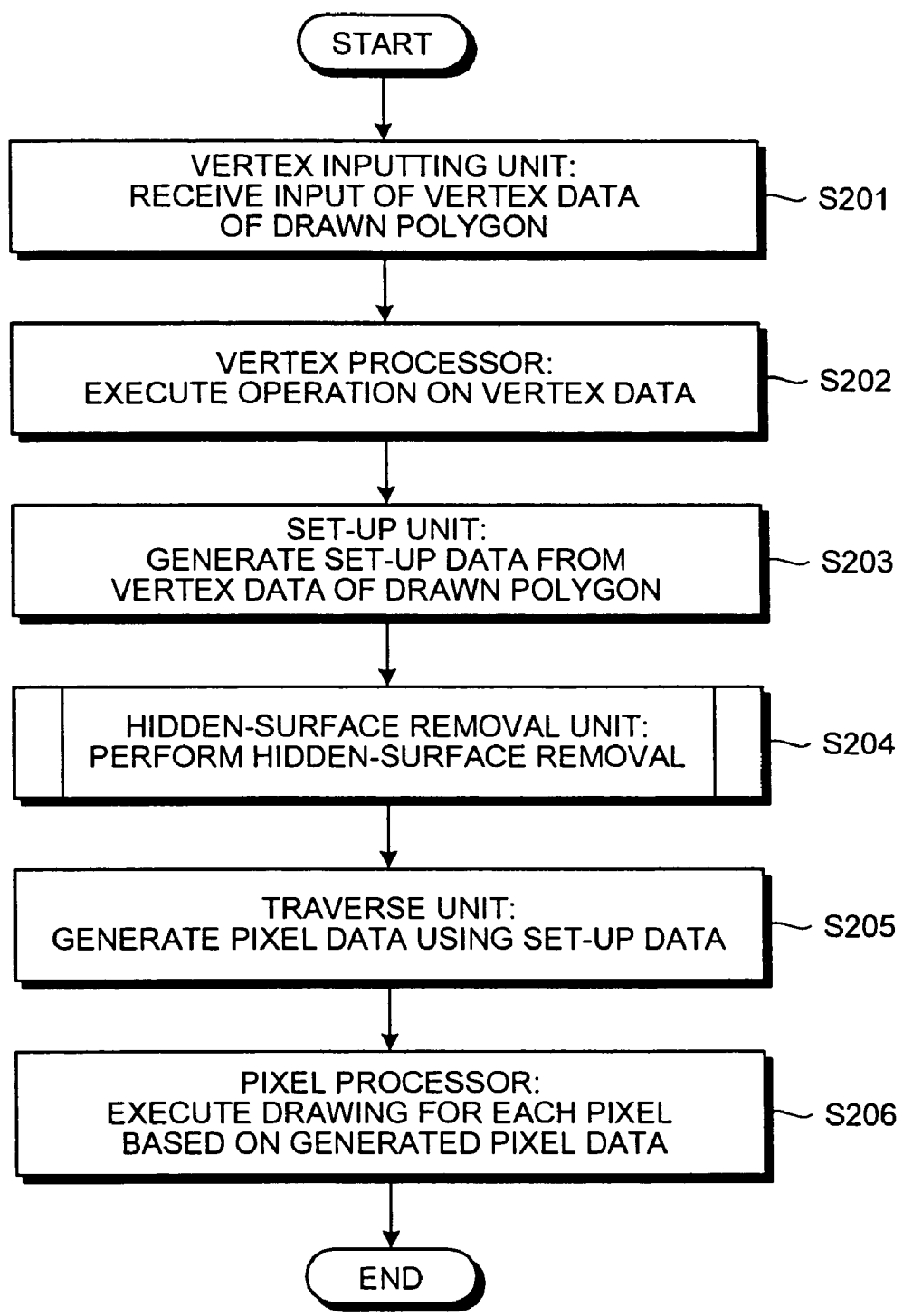
FIG. 2 is a flowchart of an overall process sequence of drawing in the image processing apparatus according to the embodiment of the present invention.

Next, the drawing by the image processing apparatus 100 according to the embodiment with the above-described structure is described. FIG. 2 is a flowchart of an overall process sequence of the drawing according to the embodiment.

First, the vertex inputting unit 110 receives vertex data of the drawn polygon as an input (step S201). Then, the vertex processor 120 performs necessary operation on the vertex data supplied by the vertex inputting unit 110 for the rasterizing by the rasterizing unit 130 (step S202).

Then, the set-up unit 131 acquires the vertex data after the operation by the vertex processor 120 from the vertex data buffer 150, to generate necessary set-up data for the rasterizing from the acquired vertex data (step S203).

The hidden-surface removal unit 132 performs hidden-surface removal for each block for the drawn polygon (step S204). The hidden-surface removal is described later more in detail.

After the hidden-surface removal by the hidden-surface removal unit 132, the traverse unit 133 generates pixel data for the block which is not eliminated by the hidden-surface removal using the set-up data generated by the set-up unit 131 (step S205).

Then the pixel processor 140 performs drawing for each pixel with the pixel data generated by the traverse unit 133 (step S206), to complete the drawing. Here, the drawing is a process for each polygon. With the repetition of the drawing process for all the polygons constituting the three-dimensional figure which is the object of drawing, the drawing of the whole object is completed.

Figure 3:
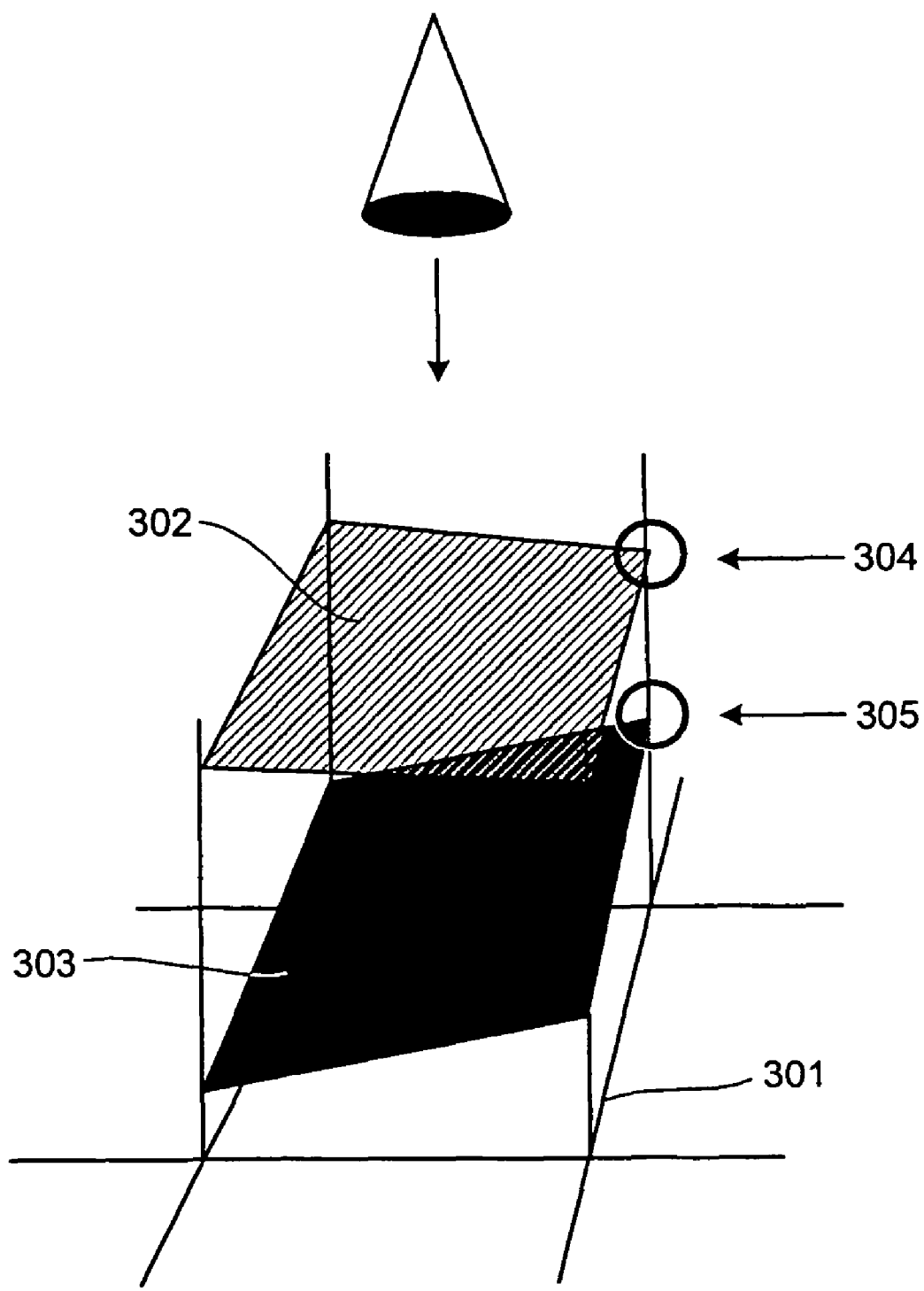
FIG. 3 is an explanatory view of an example of a relation between a polygon and a Z value.

Next, an outline of the hidden-surface removal at step S204 by the image processing apparatus 100 according to the embodiment with the above-described structure is described. FIG. 3 is an explanatory diagram of an example of a relation between the polygon and the pixel corresponding to the Z value in the hidden-surface removal for each block.

As shown in FIG. 3, a direction of an arrow shown in an upper section of FIG. 3 (vertical direction) is the direction of visual line. In the coordinate shown in FIG. 3, the upper section in FIG. 3 is closer to the viewpoint while the lower section in FIG. 3 is farther from the viewpoint. A pixel 304 is a deepest pixel among pixels of a polygon 302 which is already drawn in a block 301 under the hidden-surface removal. The Z value of the pixel 304 is stored in the hierarchical Z buffer 160 as the hierarchical Z value.

A closest pixel to the viewpoint among pixels of the drawn polygon 303 is a pixel 305. When the pixel 305 is located at a deeper point than the pixel 304, all the pixels of the drawn polygon 303 in the block 301 are located at deeper points than the already drawn pixels. Hence, the subsequent drawing process can be eliminated (hidden-surface removal).

In FIG. 3, only one polygon is already drawn in the block 301. When plural polygons are already drawn in the block 301, the Z value of a pixel located at a deepest point among the pixels of these polygons is stored in the hierarchical Z buffer 160.

With the block-based hidden-surface removal using the hierarchical Z buffer 160, the number of processes such as the memory access to the Z buffer 170 or to the drawing buffer 180 by the pixel processor 140, which is the bottleneck of the throughput, can be decreased to realize improved processing performance.

Figure 4:
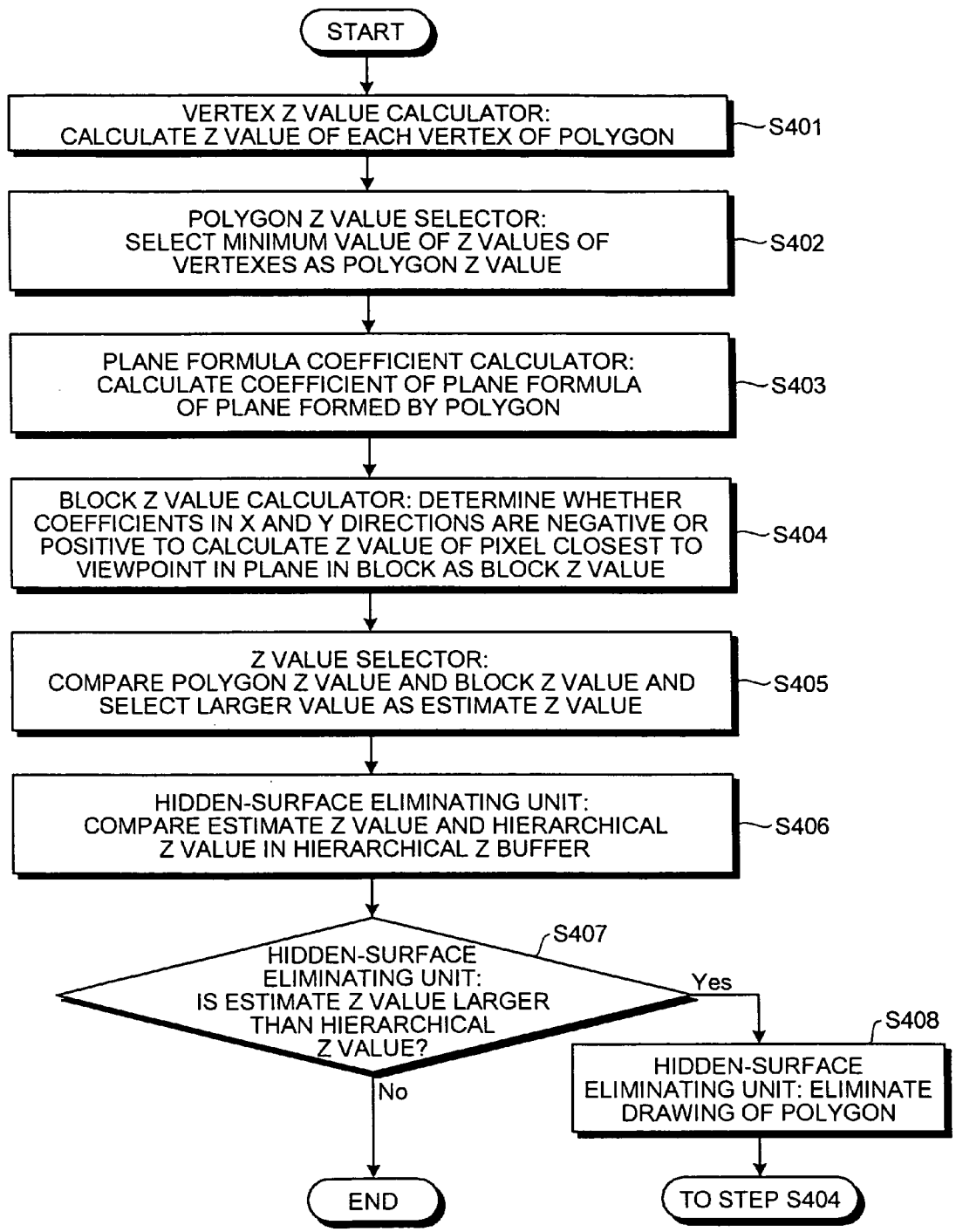
FIG. 4 is a flowchart of an overall process sequence of hidden-surface removal in the image processing apparatus according to the embodiment of the present invention.

Next, the hidden-surface removal in step 204 by the image processing apparatus 100 according to the embodiment with the above-described structure is described. FIG. 4 is a flowchart of an overall process sequence of the hidden-surface removal according to the embodiment.

First, the vertex Z value calculator 132a calculates the vertex Z value which is the Z value of each vertex of the polygon (step S401). Specifically, the vertex Z value calculator 132a calculates the vertex Z value through the following sequence.

The vertex Z value calculator 132a acquires the position coordinate of the drawn polygon in the coordinate system where the viewpoint corresponds to the origin and the direction of visual line corresponds to the Z direction from the set-up data generated by the set-up unit 131.

The position coordinate is represented by a three-dimensional vector (x,y,z) in the three-dimensional space coordinate system, or by a four-dimensional vector (x,y,z,w) in the homogeneous coordinate system. The homogeneous coordinate system is a coordinate system created with an addition of one dimension, i.e., one element w to the three-dimensional coordinate system. A four-dimensional vector (x,y,z,w) in the homogeneous coordinates corresponds to the three-dimensional vector (x/w,y/w,z/w) in the three-dimensional space coordinates.

When the acquired position coordinates is the three-dimensional vector (x,y,z), the vertex Z value calculator 132a calculates a Z value data $Z\_V_n$ of an nth vertex based on Expression (1):

$$Z\_V_n = z_n \quad (1)$$

where $z_n$ represents a z component of the three-dimensional vector which represents the position of the $n^{th}$ (n=0, 1, 2, ...) vertex.

When the acquired position coordinates is the four-dimensional vector (x,y,z,w) in the homogeneous coordinate system, the vertex Z value calculator 132a calculates a Z value data Z_Vn of the nth vertex based on Expression (2):

$$Z\_V_n = z_n/w_n \quad (2)$$

where $z_n$ and $w_n$ represent a z component and a w component of the three-dimensional vector which represents the position of the $n^{th}$ vertex, respectively.

The above-described calculation is merely an example, and any technique can be used for the calculation of the Z values of respective vertexes of the polygon.

After the vertex Z value calculator 132a calculates the vertex Z value in step S401, the polygon Z value selector 132b selects the minimum value among the calculated vertex Z values as the polygon Z value (step S402).

Specifically, the polygon Z value Z_poly can be selected based on Expression (3):

$$Z\_poly = \min(Z\_V_0, Z\_V_1, \ldots, Z\_Vn) \quad (3)$$

where min(A,B,C) represents an operation for finding the minimum value among A, B, and C.

In the coordinate system where a larger Z value represents a closer pixel to the viewpoint, the polygon Z value Z_poly can be selected based on Expression (4):

$$Z\_poly = \max(Z\_V_0, Z\_V_1, \ldots, Z\_Vn) \quad (4)$$

where max(A,B,C) is an operation for finding the maximum value among A, B, and C.

Here, since the polygon Z value is the value calculated for each polygon, the calculation thereof is not necessary for each drawing process of a block. The calculated polygon Z value is stored when the process shifts from one polygon to another, and the stored value can be utilized during the processing of one polygon.

Since all the pixels in the polygon are guaranteed to be located at deeper points than the pixel corresponding to the calculated polygon Z value, the polygon Z value can be employed as a reference for the comparison at the hidden-surface removal.

After the polygon Z value selector 132b selects the polygon Z value in step S402, the plane formula coefficient calculator 132c calculates the coefficient of the plane formula of a plane formed by the drawn polygon (step S403). Suppose that the plane formula is represented by Expression (5):

$$z = ax + by + c \quad (5)$$

Thus, coefficients a and b can be calculated via a substitution of the values of three coordinates of the vertexes of the polygon into Expression (5) and finding a solution of the simultaneous equation.

Next, the block Z value calculator 132d determines whether the coefficients of the plane formula in the X and Y directions calculated by the plane formula coefficient calculator 132c are negative or positive, and calculates the Z value of a pixel located closest to the viewpoint among the pixels in the plane represented by the plane formula in the bock under the hidden-surface removal as the block Z value (step S404). Specifically, the block Z value calculator 132d calculates the Z value of a pixel of a closest vertex to the viewpoint among the vertexes of a rectangle formed in the block by the plane represented by the plane formula as the block Z value.

For example, assume that a block is set as a rectangle having two sides parallel to the X axis and the Y axis, respectively, in the coordinate system having the Z axis in the direction of visual line, the X axis in the horizontal direction toward the right, and the Y axis in the vertical direction upwards. When the coefficients a and b of the X and Y directions of the plane formula represented by Expression (5) are both positive, the Z value of the lower left vertex of the rectangle formed by the plane in the block is the block Z value. Similarly, when a is positive and b is negative, the Z value of the upper left vertex, when a is negative and b is positive, the Z value of the lower right vertex, and when a and b are both negative, the Z value of the upper right vertex is the block Z value.

In the above description, the polygon Z value selection in steps S401 to S402 is followed by the block Z value calculation in step S403 to S404. However, the block Z value calculation may be performed first, or the polygon Z value selection and the block Z value calculation may be performed in parallel.

Then, the Z value selector 132e compares the polygon Z value selected by the polygon Z value selector 132b and the block Z value calculated by the block Z value calculator 132d, to select a larger value as the estimated Z value (step S405).

Specifically, the estimated Z value, Z_estimate, can be selected based on Expression (6):

$$Z\_estimate = \max(Z\_block, Z\_poly) \quad (6)$$

where Z_block represents the block Z value.

In the coordinate system where a larger Z value corresponds with a closer pixel to the viewpoint, the estimated Z value, Z_estimate, can be selected according to Expression (7):

$$Z\_estimate = \min(Z\_block, Z\_poly) \quad (7)$$

The hidden-surface eliminating unit 132f compares the estimated Z value selected by the Z value selector 132e and the hierarchical Z value stored in the hierarchical Z buffer 160 (step S406), and determines whether the estimated Z value is larger than the hierarchical Z value (step S407). Here, since the coordinate system is set so that a smaller Z value corresponds to a closer pixel to the viewpoint, the determination on whether the estimated Z value is larger than the hierarchical Z value means the determination on whether the pixel corresponding to the estimated Z value is located at a deeper point than the pixel corresponding to the hierarchical Z value.

In a coordinate system where a larger Z value corresponds to a closer pixel to the viewpoint, the determination on whether the estimated Z value is smaller than the hierarchical Z value allows the determination on whether the pixel corresponding to the estimated Z value is located at a deeper point than the pixel corresponding to the hierarchical Z value.

When the estimated Z value is determined to be larger than the hierarchical Z value in step S407 (Yes in step S407), the hidden-surface eliminating unit 132f eliminates the drawing in the block under the hidden-surface removal (step S408). Thereafter, the process returns to step S404 for the drawing of a next block and repeat the process as described above.

When the estimated Z value is determined to be smaller than the hierarchical Z value in step S407 (No in step S407), the hidden-surface eliminating unit 132f completes the hidden-surface removal without eliminating the drawing. Thereafter the traverse unit 133 generates the pixel data (step S205) and the pixel processor 140 performs drawing for each pixel (step S206).

Figure 5:
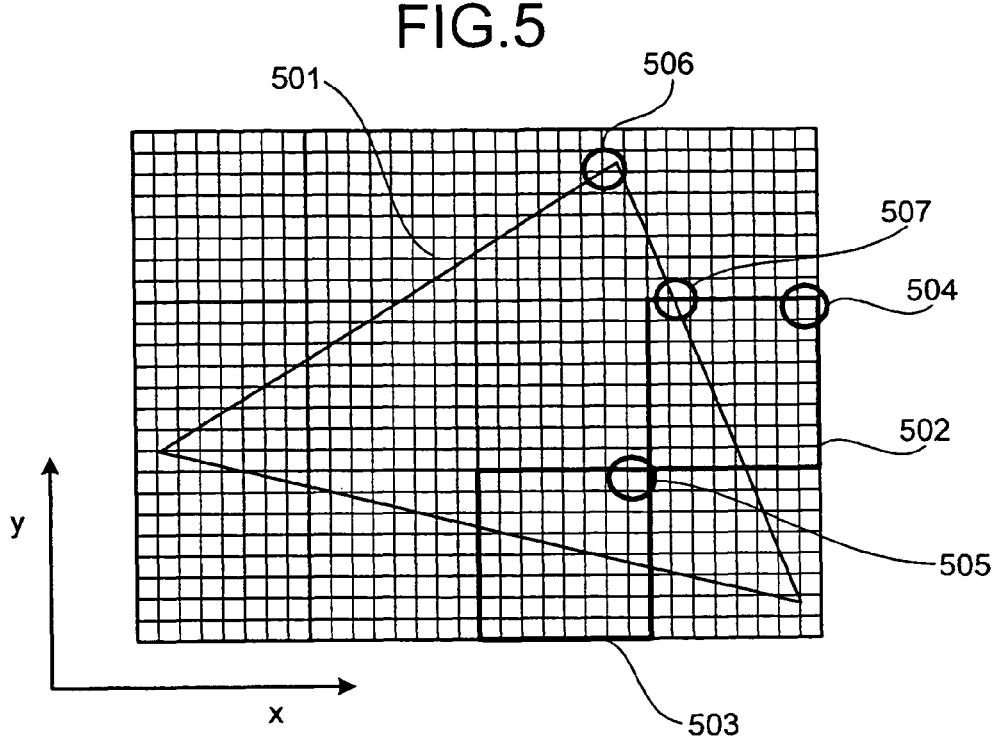
FIG. 5 is an explanatory diagram of an example of a relation among an estimated Z value and a block and a polygon.

FIG. 5 is an explanatory diagram of an example of a relation among an estimated Z value calculated in the hidden-surface removal as described above and the block and the polygon. In FIG. 5, the block is a rectangular area of 8 pixels by 8 pixels, and the Z axis is taken along the direction of visual line. In FIG. 5, shown are a pixel 504 and a pixel 505 corresponding to block Z values calculated at the hidden-surface removal of a polygon 501 in a block 502 and a block 503, and a pixel 506 corresponding to the polygon Z value.

The polygon Z value selected by the polygon Z value selector 132b (step S402) is a Z value of one vertex, e.g., the pixel 506, of the polygon. In the example, the polygon 501 is inclined so that the upper right side thereof protrudes forward.

When the upper right side of the plane formed by the polygon 501 protrudes forwards, the inclination coefficients a and b of the X and Y directions in the plane formula (Expression (5) above) of the plane formed by the polygon 501 found by the plane formula coefficient calculator 132c are both negative (step S403). Hence, the block Z value calculator 132d calculates the Z value of the pixel 504 located at the upper right corner of the block 502 in the block 502, and the Z value of the pixel 505 located at the upper right corner of the block 503 in the block 503, as the block Z values (step S404).

The Z value selector 132e compares the block Z value and the polygon Z value for each block and selects a larger value as the estimated Z value (step S405). For example, in the block 503, since the pixel 505 corresponding to the block Z value is located inside the polygon area, the block Z value is always larger than the polygon Z value. Then, the comparison between the block Z value and the polygon Z value always results in the selection of the block Z value which is the Z value of the pixel 505 as the estimated Z value. Here, the estimated Z value is same with the $Z_{near}$ value and the hidden-surface removal is performed properly without decreased efficiency.

On the other hand, in the block 502, since the pixel 504 corresponding to the block Z value is located outside the polygon area, the comparison between the block Z value and the polygon Z value is performed for the selection of the larger value as the estimated Z value. Here, the $Z_{near}$ value is, for example, a Z value of a pixel 507 located at a crossing point of the block 502 and the polygon 501.

Therefore, the estimated Z value is equal to or smaller than the $Z_{near}$ value, which suggests possible decrease in the efficiency of hidden-surface removal. However, with the selection of a closer value to the $Z_{near}$ value from two estimated values, i.e., the block Z value and the polygon Z value, the frequency of efficiency decrease can be reduced.

Figure 6:
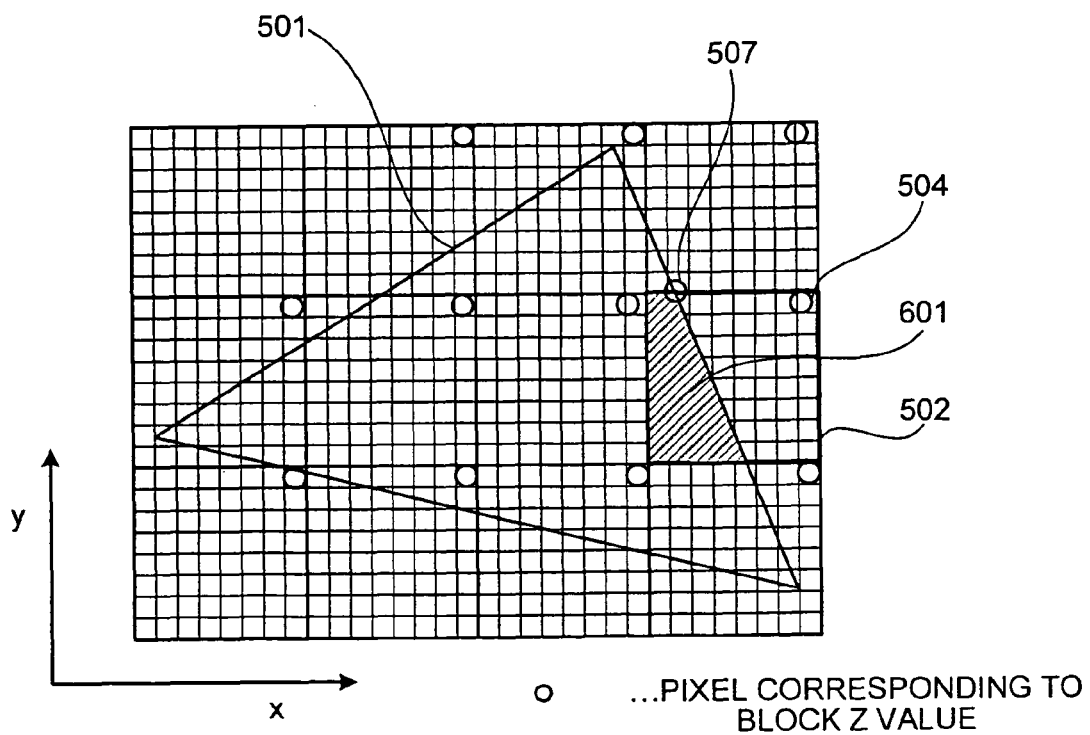
FIG. 6 is an explanatory diagram of an example of a relation among a block Z value and a block and a polygon.

FIG. 6 is an explanatory diagram of an example of a relation among the block Z value calculated at the hidden-surface removal according to the method proposed in Patent Literature 1 on the polygon as shown in FIG. 5 and the block and the polygon.

In the method proposed in Patent Literature 1, a Z value (block Z value) is calculated solely by a unit corresponding to the block Z value calculator 132d of the embodiment, and the calculated value is utilized for the hidden-surface removal. In other words, the Z value of the upper right pixel in the block is the block Z value as shown in FIG. 6, and this value is always employed for the hidden-surface removal. For example, in the block 502, the Z value of the pixel 504 is calculated as the block Z value and employed for the hidden-surface removal. Since a shared area 601 of the polygon 501 and the block 502 is not considered, the calculation of the precise $Z_{near}$ value corresponding to the pixel 507 is not necessary dissimilar to the conventional method, which allows realization of a high-speed hidden-surface removal. However, in such method, the difference between the block Z value and the $Z_{near}$ value may become large to decrease the efficiency of hidden-surface removal.

In particular, when the size of the polygon is relatively small with respect to the block due to increased resolution of data or the like as in the example shown in FIG. 6, the pixel corresponding to the calculated block Z value is likely to be present outside the polygon area, and hence, the decrease in efficiency of the hidden-surface removal is likely to happen.

Contrarily, in the embodiment of the present invention, in addition to the block Z value, the polygon Z value found from the Z value of each vertex of the polygon is employed for the selection of the precise value for the hidden-surface removal. Hence, the decrease in efficiency of the hidden-surface removal can be prevented also for the high-resolution data with many small polygons.

Figure 7:
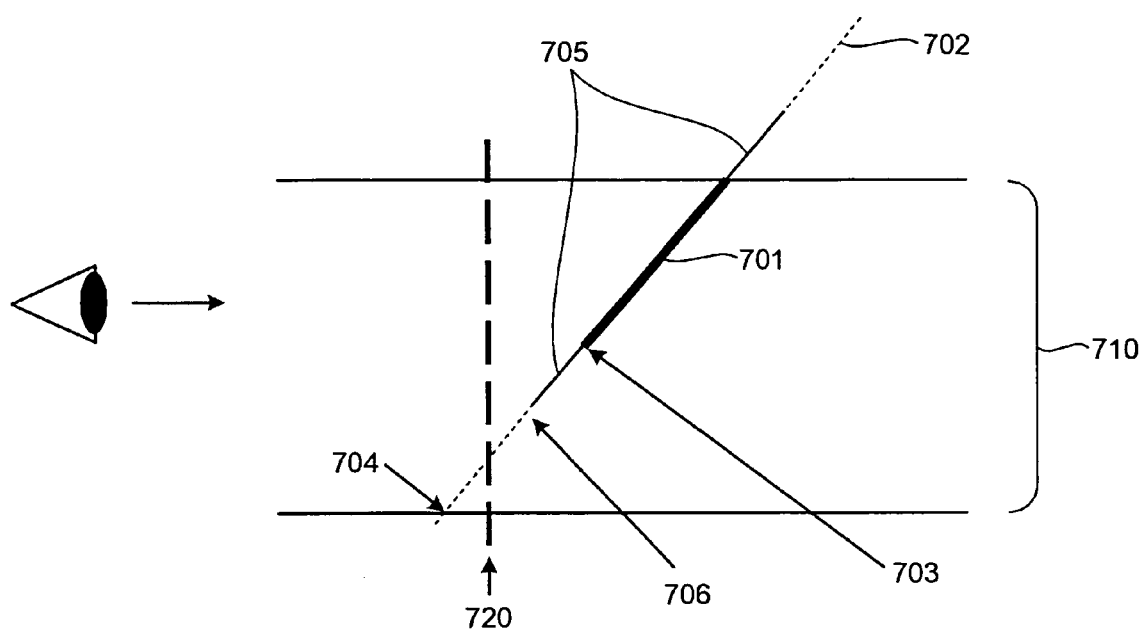
FIG. 7 is an explanatory diagram of an example of a relation among a Z value and a block and a polygon.

FIG. 7 is an explanatory diagram of an example of a relation among each Z value and the block and the polygon where the efficiency of the hidden-surface removal is increased according to the embodiment compared with the conventional method. In FIG. 7, the Z axis representing the direction of visual line is shown in a lateral direction dissimilar to FIGS. 5 and 6. In a block 710 in FIG. 7, a Z value of a closest point to the viewpoint among a polygon 701 in the block 710 is a $Z_{near}$ value 703. A hierarchical Z value 720 is a Z value which corresponds to a position shown by a dotted line in FIG. 7.

In the conventional method, the estimate of the $Z_{near}$ value is calculated based only on a block Z value 704 which is a Z value of a closest point to the viewpoint among points where an extension 702 of the plane formed by the polygon and the block 710 intersect with each other. The calculated estimate is compared with the hierarchical Z value 720. Then, the pixel corresponding to the calculated estimate (block Z value 704) is determined to be located at a closer point to the viewpoint than the pixel corresponding to the hierarchical Z value 720. Then, the drawing cannot be properly eliminated for each block in the hidden-surface removal.

In the embodiment of the present invention, however, the block Z value 704 is compared with a polygon Z value 706, which is a Z value corresponding to the closest point to the viewpoint in an entire polygon area 705, and the larger value, i.e., the polygon Z value 706 is calculated as the estimate of the $Z_{near}$ value. The calculated value is compared with the hierarchical Z value 720. Then, the pixel corresponding to the estimate (polygon Z value 706) is determined to be located at a deeper point from the viewpoint than the pixel corresponding to the hierarchical Z value 720. Hence, the drawing can be properly eliminated for each block by the hidden-surface removal.

Thus the image processing apparatus 100 according to the embodiment compares the block Z value selected from four corners of the block and the polygon Z value selected from three vertexes of the drawn polygon, uses the larger value as the estimate Z value, which is the estimate of the $Z_{near}$ value, thereby executes the hidden-surface removal. Hence, the decrease in efficiency of the hidden-surface removal is prevented also for the high-resolution data with many small polygons. Further, the number of the processes such as memory access to the Z buffer 170 or the drawing buffer 180 by the pixel processor 140, which is the bottleneck in the process, can be reduced, whereby the improvement in drawing performance can be achieved for the 3D computer graphics.

The image processing apparatus of the embodiment includes a controller such as a central processing unit (CPU), a storage such as a read only memory (ROM) and random access memory (RAM), an external storage such as a hard disc drive (HDD) or a CD drive, a display such as a display monitor, and an input device such as a keyboard or a mouse, and configured as an ordinary computer hardware.

The computer program for image processing executed in the image processing apparatus according to the embodiment is recorded in an installable format or an executable format file in a computer readable recording medium such as a CD-ROM, a flexible disc (FD), a CD-R, and a digital versatile disk (DVD).

Alternatively, the image processing program executed by the image processing apparatus according to the embodiment can be stored in a computer connected to a network such as the Internet, and downloaded via the network. Still alternatively, the image processing program executed by the image processing apparatus according to the embodiment may be provided or distributed via a network such as the Internet.

Further, the image processing program according to the embodiment may be previously embedded into an ROM or the like and provided.

The image processing program executed by the image processing apparatus according to the embodiment is configured as a module including the above-described components (the vertex inputting unit, the vertex processor, the set-up unit, the vertex Z value calculator, the polygon Z value selector, the plane formula coefficient calculator, the block Z value calculator, the Z value selector, the hidden-surface removal unit, the traverse unit, and the pixel processor). In an actual hardware, the CPU (processor) reads out the image processing program from the recording medium and executes the same to load the above-listed components in a main memory, so that respective components are generated on the main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
    a hierarchical Z value storage that stores a hierarchical Z value which is a coordinate value, in a depth direction, of a pixel located at a farthest point from a viewpoint among pixels already drawn in a block, the block being a section formed as a part of a drawing area in which an image of three-dimensional computer graphics is drawn;
    a first Z value calculator that calculates a polygon Z value which is a coordinate value, in the depth direction, of a vertex located at a closest point to the viewpoint among vertexes of a polygon to be drawn;
    a second Z value calculator that calculates a block Z value which is a coordinate value, in the depth direction, of a pixel located at a closest point to the viewpoint in the block among pixels included in a plane formed by the polygon to be drawn;
    a Z value selector that selects a Z value from among the polygon Z value, calculated from vertexes of the polygon to be drawn, and the block Z value, calculated from corners of the block, based on which is farther from the viewpoint, as an estimate Z value which is an estimate of a coordinate value, in the depth direction, of a pixel located at a closest point to the viewpoint in the block; and
    a hidden-surface removal unit that eliminates drawing of a plurality of pixels comprised by the polygon in the block when a pixel corresponding to the estimate Z value is located at a farther point from the viewpoint than a pixel corresponding to the hierarchical Z value, the drawing of the polygon including generating pixel data for the block.

2. The image processing apparatus according to claim 1, wherein the first Z value calculator comprises:
    a vertex Z value calculator that calculates a vertex Z value which is a coordinate value, in the depth direction, of each vertex of the polygon, and
    a polygon Z value selector that selects the pixel Z value of a vertex which is located at a closest point to the viewpoint among the vertex Z values, as the polygon Z value.

3. The image processing apparatus according to claim 1, wherein the second Z value calculator comprises:
    a plane formula coefficient calculator that calculates coefficients in an X direction and a Y direction of a plane formula which represents a plane formed by the polygon, and
    a block Z value calculator that calculates a coordinate value, in the depth direction, of a pixel which is located at a closest point from the viewpoint in the block among pixels included in the plane formed by the polygon, based on a combination of positive and negative coefficients in the X and the Y directions, as the block Z value.

4. The image processing apparatus according to claim 1, wherein the polygon as the unit of drawing is a triangle.

5. An image processing method comprising:
    calculating a polygon Z value which is a coordinate value in a depth direction of a vertex located at a closest point to a viewpoint among vertexes of a polygon to be drawn;
    calculating a block Z value which is a coordinate value, in the depth direction, of a pixel located at a closest point to the viewpoint in a block, which is a section formed as a part of a drawing area in which an image of three-dimensional computer graphics is drawn, among pixels included in a plane formed by the polygon to be drawn;

selecting a Z value from among the polygon Z value, calculated from vertexes of the polygon to be drawn, and the block Z value, calculated from corners of the block, based on which is farther from the viewpoint, as an estimate Z value which is an estimate of a coordinate value in the depth direction of a pixel located at a closest point to the viewpoint in the block; and eliminating drawing of a plurality of pixels comprised by the polygon in the block when a pixel corresponding to the estimate Z value is located at a farther point from the viewpoint than a pixel corresponding to a hierarchical Z value, the hierarchical Z value being a coordinate value, in the depth direction, of a pixel located at a farthest point from the viewpoint among pixels already drawn in the block and being stored in a storing unit, the drawing of the polygon including generating pixel data for the block.

6. The image processing method according to claim 5, wherein calculating of the polygon Z value includes calculating a vertex Z value which is a coordinate value, in the depth direction, of each vertex of the polygon, and selecting the pixel Z value of a vertex which is located at a closest point to the viewpoint among the vertex Z values, as the polygon Z value.

7. The image processing method according to claim 5, wherein calculating of the block Z value includes calculating coefficients in an X direction and a Y direction of a plane formula which represents a plane formed by the polygon, and calculating a coordinate value, in the depth direction, of a pixel which is located at a closest point from the viewpoint in the block among pixels included in the plane formed by the polygon, based on a combination of positive and negative coefficients in the X and the Y directions, as the block Z value.

8. The image processing method according to claim 5, wherein the polygon as the unit of drawing is a triangle.

9. A non-transitory computer readable medium including programmed instructions for image processing, wherein the instructions, when executed by a computer, cause the computer to perform:

calculating a polygon Z value which is a coordinate value in a depth direction of a vertex located at a closest point to a viewpoint among vertexes of a polygon to be drawn;

calculating a block Z value which is a coordinate value, in the depth direction, of a pixel located at a closest point to the viewpoint in a block, which is a section formed as a part of a drawing area in which an image of three-dimensional computer graphics is drawn, among pixels included in a plane formed by the polygon to be drawn;

selecting a Z value from among the polygon Z value, calculated from vertexes of the polygon to be drawn, and the block Z value, calculated from corners of the block, based on which is farther from the viewpoint, as an estimate Z value which is an estimate of a coordinate value in the depth direction of a pixel located at a closest point to the viewpoint in the block; and eliminating drawing of a plurality of pixels comprised by the polygon in the block when a pixel corresponding to the estimate Z value is located at a farther point from the viewpoint than a pixel corresponding to a hierarchical Z value, the hierarchical Z value being a coordinate value, in the depth direction, of a pixel located at a farthest point from the viewpoint among pixels already drawn in the block and being stored in a storing unit, the drawing of the polygon including generating pixel data for the block.

10. The non-transitory computer readable medium according to claim 9, wherein calculating of the polygon Z value includes calculating a vertex Z value which is a coordinate value, in the depth direction, of each vertex of the polygon, and selecting the pixel Z value of a vertex which is located at a closest point to the viewpoint among the vertex Z values, as the polygon Z value.

11. The non-transitory computer readable medium according to claim 9, wherein calculating of the block Z value includes calculating coefficients in an X direction and a Y direction of a plane formula which represents a plane formed by the polygon, and calculating a coordinate value, in the depth direction, of a pixel which is located at a closest point from the viewpoint in the block among pixels included in the plane formed by the polygon, based on a combination of positive and negative coefficients in the X and the Y directions, as the block Z value.

12. The non-transitory computer readable medium according to claim 9, wherein the polygon as the unit of drawing is a triangle.

* * * * *